United States Patent
Herman

(10) Patent No.: US 8,938,399 B1
(45) Date of Patent: Jan. 20, 2015

(54) METHOD AND SYSTEM FOR AUTOMATICALLY REPAIRING A FRAUDULENT IDENTITY THEFT INCIDENT

(76) Inventor: Edward S. Herman, San Mateo, CA (US)

(*) Notice: Subject to any disclaimer, the term of this patent is extended or adjusted under 35 U.S.C. 154(b) by 1599 days.

(21) Appl. No.: 10/746,736

(22) Filed: Dec. 23, 2003

Related U.S. Application Data

(60) Provisional application No. 60/505,672, filed on Sep. 23, 2003.

(51) Int. Cl.
  *G06F 21/00* (2013.01)
  *G06Q 20/40* (2012.01)
(52) U.S. Cl.
  CPC .................................. *G06Q 20/401* (2013.01)
  USPC .......................................................... 705/50
(58) Field of Classification Search
  CPC ............................................... G06Q 10/06316
  USPC ......................................... 705/50, 35–40, 75
  See application file for complete search history.

(56) References Cited

U.S. PATENT DOCUMENTS

| | | | |
|---|---|---|---|
| 7,076,439 B1* | 7/2006 | Jaggi | 705/7.15 |
| 2002/0116247 A1* | 8/2002 | Tucker et al. | 705/8 |
| 2002/0169747 A1* | 11/2002 | Chapman et al. | 707/1 |
| 2002/0173994 A1* | 11/2002 | Ferguson, III | 705/4 |
| 2003/0041031 A1* | 2/2003 | Hedy | 705/51 |
| 2005/0144143 A1* | 6/2005 | Freiberg | 705/75 |
| 2007/0156557 A1* | 7/2007 | Shao et al. | 705/35 |
| 2007/0299771 A1* | 12/2007 | Brody et al. | 705/38 |

* cited by examiner

*Primary Examiner* — Charles C Agwumezie

(57) ABSTRACT

A method and system for automatically repairing identity theft under computer control. In one embodiment, a method is disclosed for repairing identity theft. The method accesses notification of a fraudulent identity theft incident committed on a victim. The method collects victim specific information that is associated with the fraudulent identity theft incident and the victim. Then, the method automatically populates and generates notification forms with the victim specific information. The populated notification forms detail the fraudulent identity theft incident for affected creditors and credit bureaus. Then, the method automatically transmits the notification forms to the affected creditors, credit bureaus, law enforcement agencies, and any other required entities. The method then chronicles by time in a non-volatile record all the actions taken in furtherance of repairing the fraudulent identity theft incident.

32 Claims, 12 Drawing Sheets

400

```
                    START
                      │
                      ▼
┌─────────────────────────────────────────────┐
│ BEGINNING FIRST COUNTDOWN TO FIRST FOLLOW-UP│
│ INQUIRY AFTER TRANSMISSION OF NOTIFICATION  │
│ FORMS                                        │
│ 410                                          │
└─────────────────────────────────────────────┘
                      │
                      ▼
┌─────────────────────────────────────────────┐
│ INQUIRING AS TO STATUS OF TRANSMITTED       │
│ NOTIFICATION FORMS FROM CREDITORS, AFTER A  │
│ PREDETERMINED PERIOD OF TIME                │
│ 420                                          │
└─────────────────────────────────────────────┘
                      │
                      ▼
┌─────────────────────────────────────────────┐
│ DOWNLOADING COPIES OF VICTIM'S CREDIT       │
│ REPORTS FROM CREDIT BUREAUS                 │
│ 430                                          │
└─────────────────────────────────────────────┘
                      │
                      ▼
┌─────────────────────────────────────────────┐
│ TIME STAMPING INCOMING RESPONSES AND        │
│ CREDIT FILES                                 │
│ 440                                          │
└─────────────────────────────────────────────┘
                      │
                      ▼
┌─────────────────────────────────────────────┐
│ COMPARING RESPONSE DATA AND NEW CREDIT FILES│
│ TO MOST RECENT DATA STORED IN VICTIM'S FILES│
│ TO DETERMINE IF CREDIT FILES HAVE BEEN      │
│ UPDATED                                      │
│ 450                                          │
└─────────────────────────────────────────────┘
                      │
                      ▼
┌─────────────────────────────────────────────┐
│ UPDATING THE PERMANENT RECORD WITH A TIME   │
│ STAMPED ENTRY                                │
│ 460                                          │
└─────────────────────────────────────────────┘
                      │
                      ▼
┌─────────────────────────────────────────────┐
│ BEGIN SECOND COUNTDOWN BEFORE RETURNING TO  │
│ 210 UNTIL ALL OF VICTIM'S RECORDS ARE       │
│ UPDATED PROPERLY                             │
│ 470                                          │
└─────────────────────────────────────────────┘
                      │
                      ▼
                     END
```

FIGURE 4

METHOD AND SYSTEM FOR AUTOMATICALLY REPAIRING A FRAUDULENT IDENTITY THEFT INCIDENT

RELATED U.S. APPLICATIONS

This application claims priority to the provisional patent application Ser. No. 60/505,672, entitled "Identity theft Repair System and PSA Modules and Components," with filing date Sep. 23, 2003, and assigned to the assignee of the present invention.

BACKGROUND OF THE INVENTION

1. Field of the Invention

Embodiments of the present invention relate to the field of identity theft. More particularly, embodiments of the present invention relate generally to the automatic repair of fraudulent identity theft incidents.

2. Related Art

Identity theft is one of the fastest rising forms of criminal fraud occurring in the United States. Identity theft includes use of an individual's identifying information (social security number, photo ID, credit profile, passport, etc.) for personal or monetary gain or other illicit purposes. That is, identity theft occurs when criminals use a victim's personal information to represent themselves as that victim for fraudulent purposes.

Identity theft extends beyond the common form of credit card fraud, where an unauthorized user accesses a credit account to charge goods or services. With identity theft, the criminal using a victim's personal information can assume the identity of the victim to perform business transaction all in the victim's name, such as, open credit card accounts, open bank loans, create a cell phone account, create utility accounts, lease an apartment, buy a car, etc. Moreover, the criminal may commit crimes in the name of the victim. As such, the victim's personal information in the hands of a skillful criminal will allow the criminal to assume the identity of the victim and cause them damage and potential financial ruin, extending far beyond a credit card bill.

Identity theft can occur when a criminal gets access to documents with compromising personal information to incur monetary damages. For example, in a restaurant setting, a waiter notices that a customer has dropped a pay stub that contains personal information about the customer. After the waiter picks up the pay stub, several pieces of personal information regarding the customer can be found, such as, address, social security number, telephone, pay amount, etc. In addition, the waiter may have access to a copy of a credit card slip if the customer used a credit card to make a payment. The credit card slip gives the waiter a credit card reference and a signature of the victim.

In this case, the waiter, as the criminal, now has enough information to use the customer's identity as his own. As such, the customer becomes the victim of identity theft. The criminal potentially could go a department of motor vehicles, or transport ministry to have an identification or driver's license be issued to the criminal posing as the victim. Moreover, the criminal could go to a bank and open an account with a five thousand dollar overdraft line of credit based on the victim's personal information, the credit card reference, the victims signature, and the identification documentation. When the criminal fraudulently opens the account, overdraws the account and disappears, the victim is left responsible for paying the five thousand dollar overdraft. This is a case of identity theft.

In another case, identity theft can occur when a criminal gets access to documents with compromising personal information that results in criminal charges of the victim. For example, a criminal may retrieve personal information from a victim's trash. Personal information found in the trash could be a bank statement, credit card receipt, water bill, etc. The criminal can use the victim's personal information to generate a fake driver's license using the victim's name, the victim's address, but with the criminal's picture. The water bill can be used as proof of residence. The credit card receipt can be used to obtain a replacement credit card.

In this case, the criminal can go to a rental car agency and rent a car using the replacement credit card. The criminal steals the car and never returns it. As a result, the rental car company will go after the victim for the crime of grand theft auto. The victim is thus charged with the crime of auto theft and is a victim of identity theft.

As shown above, the harm to the victim of identity theft extends beyond mere monetary damages. For instance, the identity theft may cause problems for the victim in obtaining employment, tenancy, or rights to social services. Also, the identity theft may destroy a victim's positive credit rating, which causes accounts to be closed and making it impossible to open new accounts. Moreover, the victim can be subjected to collection actions and creditors seeking remuneration for fraudulent accounts. Additionally, the victim can be subjected to arrest and detention by law enforcement based on activity of a criminal who has assumed the victim's identity. As a result the victim may spend countless sums of money and time to try to proclaim their innocence.

Currently there are no resolution methods or repair services for identity theft cases. Services or software only provide for the notification of the fraudulent identity theft incident to the appropriate authorities and creditors. These services or software do not provide for a repair of the damage incurred from the identity theft incident.

The standard documents for a victim to complete in order to initiate the reclaiming of their identity are the Identity Theft Affidavit (IDTA) and Fraudulent Account Statement (FAS). Once these documents are filed and acted upon by the appropriate creditors and credit bureaus, then a fraud alert is issued on a credit file for the victim. This fraud alert helps protect the victim from future incidents of identity theft since the victim must verify future applications for credit; however; the fraud alert does not repair the current fraudulent identity theft incident.

These documents can be obtained from a variety of web sources, including the Federal Trade Commission (FTC) website. The IDTA asks the victim to detail and document how the fraud happened, what accounts were affected as well as what information is being used illicitly. An identity theft victim needs to fill out the IDTA completely and supply supporting documentation. As a result, the victim of identity theft must manually contact the creditors and credit bureaus to remedy the fraudulent identity theft incident Additionally, the identity theft victim must complete a FAS for each fraudulent account opened in their name (credit cards, finance company, etc.) and make copies for all the credit bureaus. For example, if a victim has had five credit card accounts fraudulently opened in their name, they will have to send eight IDTAs, e.g., three to the major credit bureaus, and one to each of the five companies where the fraudulent credit card is being used along with an FAS.

In conventional art, services and software do exist to provide a victim with the either printed or electronic forms for a victim of identity theft to fill out. However, the victim still is required to research the proper process, fill out the forms, and send the forms to the proper agencies and creditors to start the repair process. In essence, there is no method to ensure that the submitted information is acted upon.

That is, the victim must manually follow up with the proper agencies and creditors to ensure that they are taking actions to repair the identity theft. This manual process is time-consuming, error prone, tedious, and frustrating, especially for someone coping with their personal information and identity having been compromised. The repair process may take two years or longer. As a result, after these items are sent to the agencies and companies, the victim must manually follow up on the progress of these documents and their processing to make sure false information has been accurately addressed and/or changed. As such, all the responsibility for solving their Identity Theft problem rests with the victim.

SUMMARY OF THE INVENTION

Accordingly, various embodiments of the present invention disclose a computer implemented method and system for automatic repair of a fraudulent identity theft incident by the automation of several processes that aid an identity theft victim. As a result, the frustrating and time-consuming process for the victim of repairing identity theft is centralized and automated. This allows a victim of identity theft to return to a more normal life without being burdened with the stresses of monitoring the lengthy repair process. Moreover, the processes of repairing identity theft and protecting the victim are much more effective and accurate through communication over a communication network. Additionally, the process of repairing identity theft can be used to protect the victim from unnecessary harassment from unpaid creditors and helps to combat allegations of criminal activity. Also, the centralized repository that collects all repair events associated with the fraudulent identity theft incident provides a means for the victim to present evidence to affected creditors, credit bureaus and any required entities in an effort to help the victim repair the fraudulent identity theft incident.

In one embodiment, a computer implemented method is disclosed for repairing identity theft. The embodiment begins by receiving notification of a fraudulent identity theft incident that is committed on a victim. The notification can be from the victim over an Internet based network. The victim implements the method to automatically repair any damage incurred from the fraudulent identity theft incident without having to manually perform the repair process. The embodiment continues by collecting victim specific information associated with the fraudulent identity theft incident and the victim, for instance.

Thereafter, the embodiment populates notification forms with the victim specific information to generate populated notification forms. These may be web-based forms. The populated notification forms detail the fraudulent identity theft incident for the affected creditors and credit bureaus. Thereafter, the present embodiment transmits the populated notification forms to the affected creditors and the credit bureaus.

Throughout the process, the present embodiment chronicles by time all actions taken in furtherance of repairing the fraudulent identity theft incident. That is, all actions taken to repair the identity theft are recorded in a permanent record or history. In this way, the record can by used to provide proof of the identity theft, so that the victim can prove he or she is not responsible for activities undertaken during the identity theft.

In another embodiment, a system is disclosed for repairing identity theft. The system comprises an upload/download module, a timing module, an operations module, and a database module. The upload/download module handles the receipt and transmission of victim specific information associated with the repair of a fraudulent identity theft incident that is committed on a victim. The timing module time stamps actions taken by the system to repair the fraudulent identity theft incident. Also, the timing module time and date stamps documents and forms generated by the present embodiment. In addition, the operations module automatically generates populated notification forms that are populated with the victim specific information. The operations module transmits the populated notification forms to affected creditors, credit bureaus, police departments, state agencies, federal agencies, and any other required entity in response to a notification of the fraudulent identity theft incident. Moreover, the database module stores the victim specific information, and the populated notification forms.

In still another embodiment, a computer system or network is disclosed for implementing a method for repairing identity theft. More specifically, the computer system comprises a processor and a computer readable memory coupled to the processor. The computer readable memory contains program instructions that when executed, implement a method for repairing identity theft. The method comprises receiving notification of a fraudulent identity theft incident committed on a victim. The method further comprises collecting victim specific information associated with the fraudulent identity theft incident and the victim. The method further comprises populating notification forms with the victim specific information. The method further comprises transmitting the populated forms to affected creditors and credit bureaus. The method also further comprises chronicling by time in a permanent record all actions taken in furtherance of repairing the fraudulent identity theft incident.

BRIEF DESCRIPTION OF THE DRAWINGS

FIG. 4 is a flow diagram illustrating computer-implemented steps for a computer controlled method of verifying that a victim's credit reports have been updated showing a fraudulent identity theft incident, in accordance with one embodiment of the present invention.

DETAILED DESCRIPTION OF THE INVENTION

Figure 1:
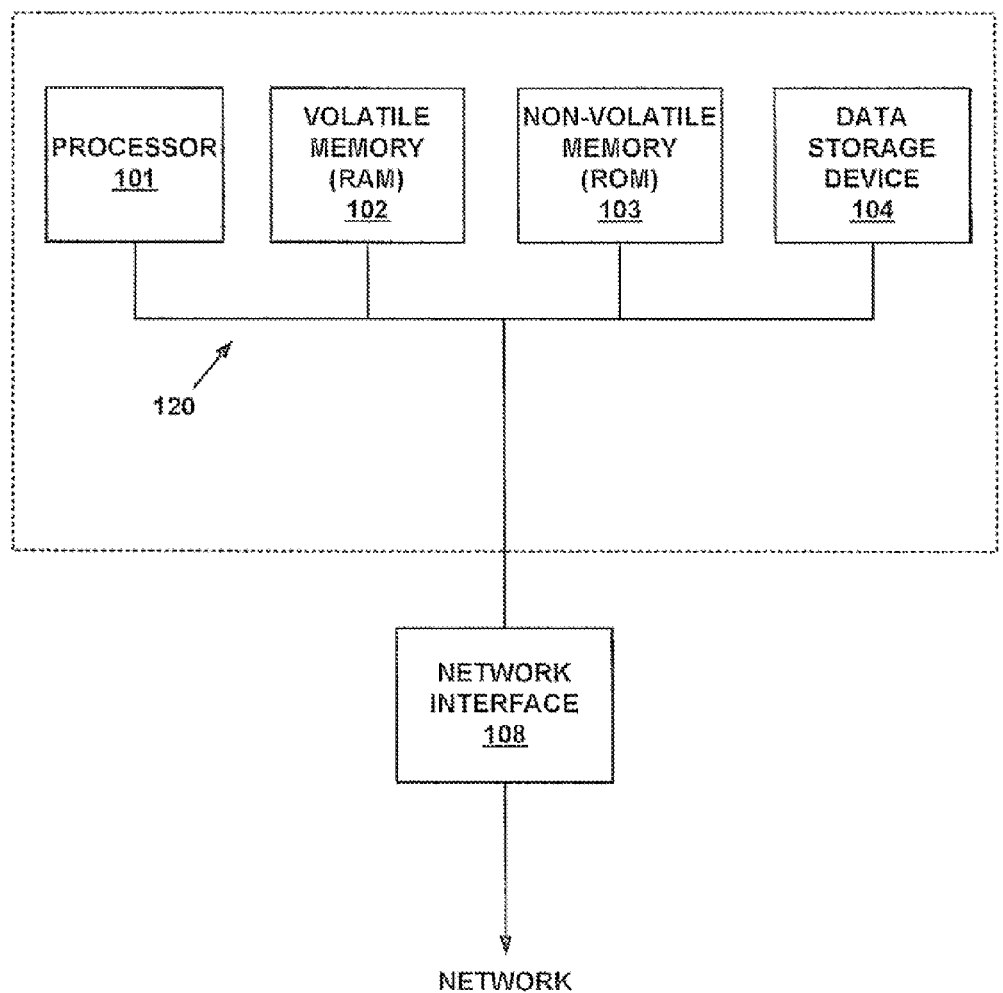
FIG. 1 is a block diagram of an exemplary computer controlled electronic system that is capable of automatically repairing identity theft, in accordance with one embodiment of the present invention.

Reference will now be made in detail to the preferred embodiments of the present invention, a method and system for automatic repair of identity theft, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "transmitting," "verifying," "generating," "navigating," "determining," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Referring to FIG. 1, embodiments of the present invention may be comprised of computer-readable and computer-executable instructions that reside, for example, in computer-readable media of a computer system that is capable of automatically repairing a fraudulent identity theft incident. That is, embodiments of the present invention can be implemented on software running on a computer system.

FIG. 1 is a block diagram of exemplary embedded components of such a computer system 100 upon which embodiments of the present invention may be implemented. The computer system can be an embedded system, a personal computer, notebook computer, server computer, mainframe, networked computer, handheld computer, personal digital assistant, workstation, and the like. The elements of the present invention may be distributed among one or more computer systems as described in FIG. 1.

Exemplary computer system 100 includes an internal address/data bus 120 for communicating information, a processor 101 coupled with the bus 120 for processing information and instructions, a volatile memory 102 (e.g., random access memory (RAM), static RAM dynamic RAM, etc.) coupled with the address/data bus 120 for storing information and instructions for the processor 101, and a non-volatile memory 103 (e.g., read only memory (ROM), programmable ROM, flash memory, EPROM, EEPROM, etc.) coupled to the address/data bus 120 for storing static information and instructions for the processor 101. Computer system 100 may also include various forms of data storage devices 104 for storing information.

With reference still to FIG. 1, an optional network interface 108 is coupled to address/data bus 120 for providing a communication link between computer system 100 and a network environment. As such, network interface 108 enables the processor 101 to communicate with browsers associated with victims that are coupled to the computer system 100. The computer system 100 is coupled to a network using the network connection, network interface 108.

Automatic Repair of Fraudulent Identity Theft Activity

Accordingly, various embodiments of the present invention disclose a method and system for automatically repairing a fraudulent identity theft incident. As a result, the frustrating and time-consuming process of repairing identity theft is centralized and computer automated. This allows a victim of identity theft to return to a more normal life without being burdened with the stresses of monitoring the lengthy repair process. Moreover, the process of repairing identity theft and protecting the victim is much more effective through communication over a communication network. Additionally, the process of repairing identity theft can be used to protect the victim from unnecessary harassment from unpaid creditors and to combat allegations of criminal activity.

Figure 2:
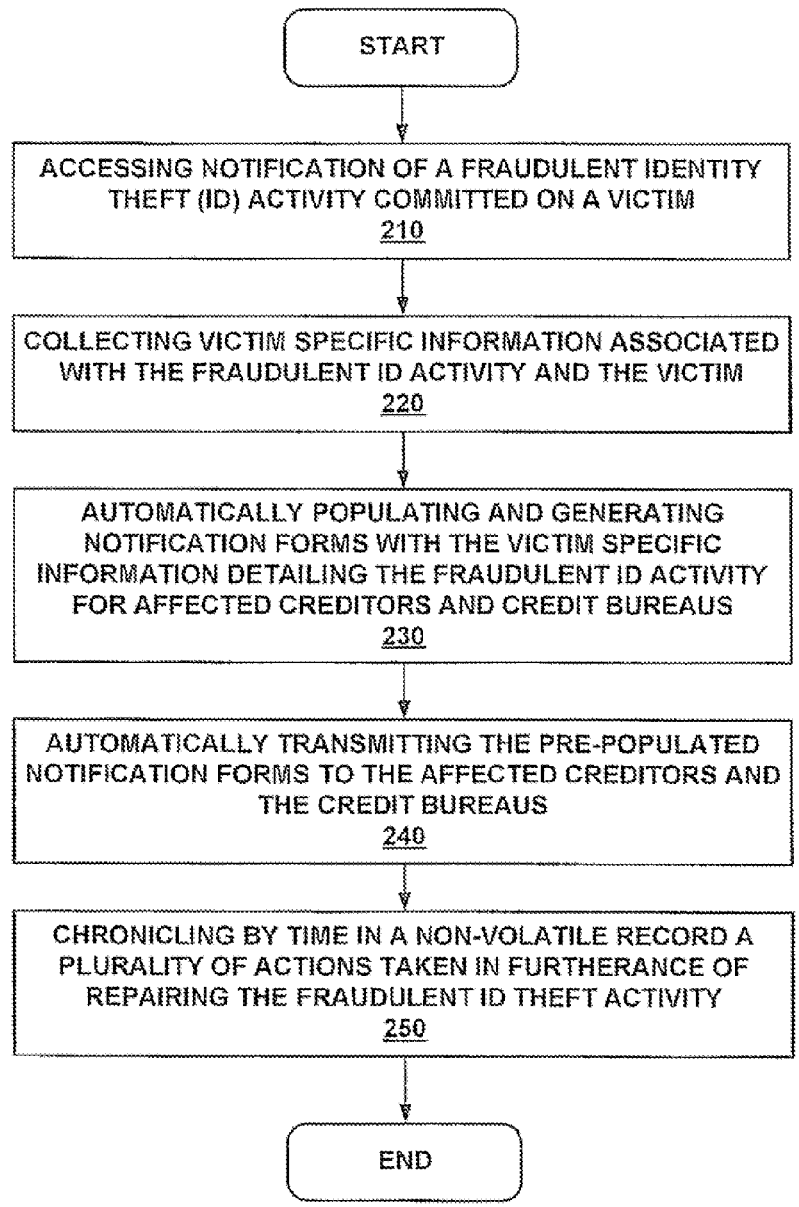
FIG. 2 is a flow diagram illustrating computer-implemented steps for a method of automatically repairing a fraudulent identity theft incident, in accordance with one embodiment of the present invention.

FIG. 2 is a flow diagram 200 illustrating steps in a computer-implemented method for automatically repairing identity theft, in accordance with one embodiment of the present invention. The present embodiment unburdens the victim of identity of the responsibility for repairing the identity theft.

At 210, the present embodiment accesses notification of a fraudulent identity theft incident that is committed on a victim. Upon accessing the notification of the fraudulent identity theft incident, the automatic repair of the fraudulent identity theft incident begins. In one embodiment, the notification is received over a communication network, such as, the Internet, through a user interface to facilitate automatic repair of the fraudulent identity theft incident. In other embodiments, the notification is received through a human interface.

At 220, the present embodiment continues by collecting victim specific information associated with the fraudulent identity theft incident and the victim. That is, information is collected that is helpful in the repair of the fraudulent identity theft incident, such as, victim name, victim address, victim phone number, detailed description of the identity theft incident, etc. For example, the victim specific information includes documentation that supports and is evidence of the fraudulent identity theft incident.

At 230, the present embodiment continues by automatically populating notification forms with the victim specific information. In addition, the present embodiment automatically generates the populated notification forms. The notification forms detail the fraudulent identity theft incident and are provided for affected creditors and credit bureaus. As a result, the present embodiment generates the notification forms that are populated with the victim specific information.

In one embodiment, the notification forms are standard forms that are universally recognizable by creditors and credit bureaus. That is, the notification forms or documents are nationally recognized by credit bureaus, banks, law enforcement agencies, etc. For instance, the standard documents can be the ID Theft Affidavit (IDTA) and Fraudulent Account Statement (FAS) forms that are recognizable by the Federal Trade Commission (FTC). The IDTA details and documents how the fraudulent identity theft incident occurred, which creditors are affected (e.g., creditor account, loan, etc.), as well as which personal information associated with the victim has been compromised and is being used illicitly. Supporting documentation is usually provided with the IDTA.

In addition, the FAS form provides details concerning accounts that are compromised or fraudulently obtained through the identity theft. A separate FAS form is completed for each compromised or fraudulent account associated with the victim (credit cards, finance company, etc.). The FAS form is sent to the creditor associated with the compromised or fraudulent account, and is sent to the credit bureaus, such as, Equifax, Experian, and TransUnion.

At 240, the present embodiment automatically transmits the populated notification forms to the affected creditors and the credit bureaus. As such, the affected creditors and credit bureaus are put on notice of the fraudulent identity theft incident. In this way, a fraud alert can be instigated and placed on the victim's credit profile to help prevent future identity theft incidents, since the victim will be notified of any future incident potentially affecting the victim's credit, e.g., credit application, etc.

In addition, the present embodiment transmits the populated notification forms to associated law enforcement agencies. In this way, the victim puts the law enforcement agencies that any crime committed in the victim's name may have been falsely committed by a criminal acting as the victim.

At 250, the present embodiment chronicles by time all actions taken in furtherance of repairing the fraudulent identity theft incident. The chronological history is stored in a permanent record that is accessible by the victim as well as the affected creditors and credit bureaus.

Identity theft issues are chronicled even after the current incident or incidents are repaired on an ongoing basis. The status and updates are continued indefinitely if necessary, or until the repair service is cancelled.

The present embodiment performs the operations as described in FIG. 2 automatically at a centralized location that is accessible through a communication network, such as, the Internet. As a result, the present embodiment shifts the responsibility for repairing the fraudulent identity theft incident from the victim to a centralized computerized system that implements the method of FIG. 2. The present embodiment accumulates information in one location along with supporting documentation.

Figure 3:
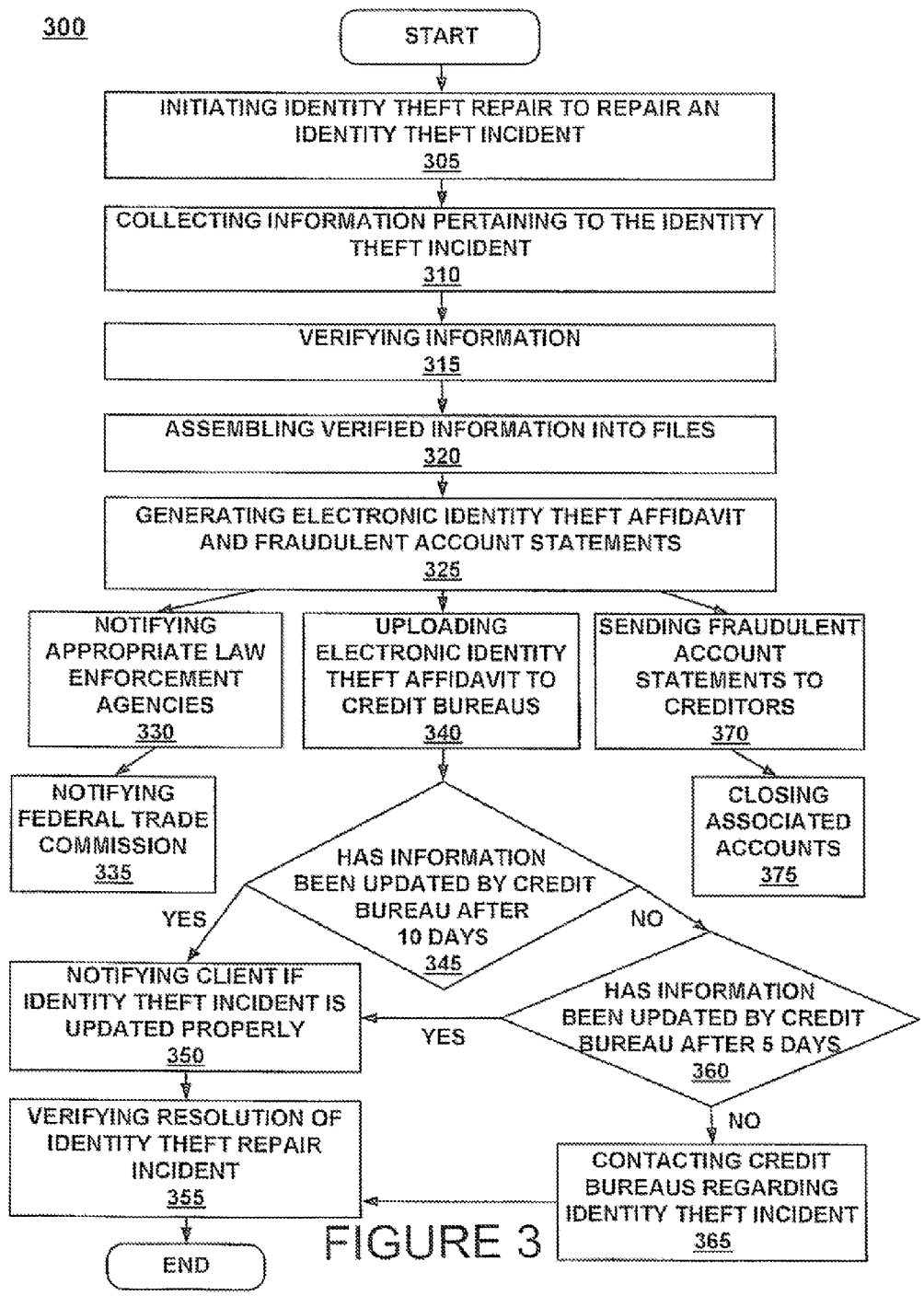
FIG. 3 is a flow diagram illustrating a computer controlled method of repairing a fraudulent identity theft incident, in accordance with one embodiment of the present invention.

FIG. 3 is a flow diagram 300 that illustrates detailed steps in a computer-implemented method for automatically repairing a fraudulent identity theft incident, in accordance with one embodiment of the present invention. The present embodiment combines the universality of standardized notification forms in an electronic format that are implemented through a centralized, web based service to provide a resolution to identity theft. The web based service accumulates information in one centralized location along with supporting documentation that are used to repair the fraudulent identity theft incident. As such, when a subscriber to the web based service falls victim to identity theft, the present embodiment can be implemented to repair the victim's identity.

At 305, the present embodiment initiates the process to repair the fraudulent identity theft incident in response to a notification of the fraudulent identity theft incident. The notification can be received by the present embodiment over a user interface accessing identity theft repair services provided by the present embodiment. In another embodiment, the notification, as well as the transfer of information and data associated with and helpful in resolving and repairing the fraudulent theft identity incident can be communicated through a manual interface (e.g., telephone interface with a customer representative).

For example, in one embodiment the interface is provided through a web application that provides the victim instant and secure access to their files at any time. As a result, within this web application, the victim can see the progress of the repair of the fraudulent identity theft incident, where and when information was sent, and what responses have been received. Also, through this application, they are able to request and print out a permanent record.

In one embodiment, the communication interface between the victim and the web-based repair service is provided through a secure web page. For instance, the communication interface is provided over an industry standard 128 bit RSA RC 4 SSL (Secure Socket Layer) to provide for security of victim information during entry and transit.

At 310, the present embodiment continues by collecting information pertaining to the fraudulent identity theft incident. For instance, the information can include victim specific information, such as, name, address, phone number, social security number, etc. Other information includes affected accounts, facts about the identity theft incident, etc.

In one embodiment, the interface through a web page has an electronic version or "web-form" of the notification forms (e.g., the IDTA and the FAS). The web page interface provides prompts for specific information that is needed to automatically fill out the various notification forms. As a result, the present embodiment is able to collect the necessary information, as well as supporting documentation, in order to automatically complete the various notification forms on behalf of the victim. That is, the present embodiment is able to pre-populate the various notification forms with requested information.

Depending an how many affected and fraudulent opened accounts are associated with the identity theft, the present embodiment completes the necessary notification forms for the associated creditors and credit bureaus. For example, the IDTA is completed and sent to the credit bureaus. Also, a different FAS form is completed for each of the affected creditors. These FAS forms are sent to the associated creditors as well as the credit bureaus.

At 315, after the various notification forms are completed, the present embodiment provides for verification of the information provided by the victim to complete notification forms. That is, the victim has a chance to review all the information they have entered to ensure accuracy.

In another instance, the present embodiment is able to provide means for verifying the information that is provided by the victim. For example, the present embodiment is capable of verifying the fraudulent identity theft incident. For example, the present embodiment provides an avenue for the victim to send proof of residence and photo identification in order to verify the information and to be included with the IDTA. For example, an address or facsimile number can be provided to which the victim can send the information, as well as other supporting documentation.

Moreover, the present embodiment is able to review and verify the information provided to complete the notification forms to make sure it is complete. If more information is required, the present embodiment is able to inquire, prompt, contact the victim for the additional information. When the present embodiment determines that the victim submission of information is complete, an acknowledgement (e.g., e-mail acknowledgment) can be sent to the victim.

At 320, the present embodiment assembles the verified information and organizes them into files. For instance, the electronic notification forms that are generated at 325 can be organized into individual files with appropriate supporting information and documentation attached. In this way, all information and data gathered, as well as documentation produced, can be stored and catalogued for easy reference and retrieval.

At 325, as mentioned previously, the present embodiment generates the electronic forms of the IDTA and the FAS forms. The present embodiment is able to automatically generate these notification forms using the information previously collected and accessed. That is, the present embodiment populates the notification forms with the victim specific information.

The present embodiment is capable of time stamping documents that are generated. For instance, the present embodiment is able to time stamp the notification forms as they are generated. These time stamped notification forms (e.g., the IDTA and FAS) cannot be tampered with or modified without generating a new form with a new time stamp. In this way, a proper record of the repair process is implemented.

At 330, the present embodiment notifies the appropriate law enforcement agencies. That is, the present embodiment files a report with the law enforcement agency. For instance, if the victim of identity theft is criminally charged as a result of the identity theft incident, the present embodiment is able to provide evidence and notification that the charge is invalid through the reporting to the appropriate law enforcement agency.

At 335, the present embodiment notifies the FTC of the fraudulent identity theft incident. As such, the FTC is able to track the occurrence of identity theft on a national basis. In addition the FTC may decide to pursue criminal action against the criminals associated with the identity theft.

At 340, the present embodiment uploads or transmits the electronic IDTA forms to the credit bureaus. That is, the electronic IDTA form is time-stamped and transmitted to the major credit bureaus (e.g., Equifax, TransUnion, and Experian).

In addition, the present embodiment at 370, sends the appropriately completed FAS forms, that are time stamped) to the corresponding creditors as well as the credit bureaus. that is, the FAS is sent to every bank, title company or institution, which is holding or has opened a fraudulent account and directs these companies to submit a corrected credit status to the credit bureaus, thus removing the fraudulent account from the victims credit history. In this manner, the present embodiment is able to actively pursue the closing of fraudulently opened accounts, at 375.

These submissions of the notification forms to the credit bureaus triggers a 7-Year fraud alert on the victim's credit profile to prevent future activity. That is, when a credit bureau receives and IDTA, a fraud alert is placed on the victim's credit file. The fraud alert is in place for approximately 7 years, and includes a statement by the victim as to the facts of the fraudulent identity theft incident, so all current and future creditors are or will be aware of the incident. The fraud alert requires some form of confirmation by the victim and/or corroborative information before any credit accounts can be opened in the victim's name.

In one embodiment, all documents are transmitted electronically through a communication network (e.g., the Internet), thus expediting receipt and processing of information. Transmitting documents electronically is not only faster than postal delivery, but also less expensive; an electronic, time-stamped affidavit is just as valid (if not more so) than a printed notarized version. Another benefit, an electronic affidavit can become a printed version at its destination if a paper copy is required. The IDTA, printed with the time-stamp shows the document has not been tampered with or altered since the date of transmission, and serves the same purpose as a paper version sent by registered mail.

At 345, the present embodiment is capable of automatically verifying that affected creditors and the various credit bureaus have taken appropriate action to repair the fraudulent identity theft incident after a predetermined period of time. Specifically, the present embodiment is able to verify that the fraudulent identity theft incident has been updated on the victim's credit file with the various credit bureaus. That is, the present embodiment is able to verify if a fraud alert has been placed in the victim's credit file. Verification is provided after a predetermined period of time, such as, after five or ten days.

In addition, another embodiment is capable of automatically notifying the victim when a fraud alert has been issued. The notification can be electronically delivered, or otherwise. In addition, the present embodiment is capable of recording the fraud alert incident, as well as any information pertaining to the fraud alert.

Moreover, the time stamping of the outgoing files triggers a countdown to an automatic follow-up inquiry to see if the fraud alert has been placed on a credit file. These inquiries are also sent to any creditor (e.g., bank or company) where a FAS was sent. These inquiries continue until the information has been updated and victim is notified via email of each update.

If the present embodiment determines that the fraudulent identity theft incident has been properly updated after a predetermined period of time, the present embodiment notifies the victim of such, at 350.

On the other hand, if the present embodiment determines that the fraudulent identity theft incident has not been properly updated, then the present embodiment triggers a follow-up inquiry to see if the fraud alert has been placed in the credit file. As such, the present embodiment may send a reminder or inquiry to the appropriate creditors and credit bureaus that are not taking appropriate action with regards to the fraudulent identity theft incident.

At 365, another waiting period may be triggered (e.g., 5 days) or the present embodiment may continue by immediately contacting the credit bureaus to inquire regarding the status of the updating of the victim's credit file, and the placing of the fraud alert into the credit file, at 365. These inquiries continue until all the information has been updated and the victim is notified of each update (e.g., through e-mail).

Thereafter, after the successful completion of the operations at 350 and/or 365, the present embodiment verifies the resolution and repair of the fraudulent identity theft incident, at 355. In this manner, the present embodiment relieves the burden of following up on progress of repairing the fraudulent identity theft incident from the victim.

FIG. 4 is a flow diagram 400 illustrating steps in a computer-implemented method for implementing an automatic follow-up inquiry to creditors and credit bureaus to verify if appropriate action is taken to repair a fraudulent identity theft incident, in accordance with one embodiment of the present invention.

At 410, the present embodiment begins the first countdown to the first follow-up inquiry after transmission of the notification forms. That is, the follow up time period is started after the appropriate agencies have been notified.

At 420, after the appropriate time period has passed (e.g., 10 days), the present embodiment inquires as to the status of the transmitted notification forms from the credit bureaus. Specifically, the present embodiment is checking to see if the credit file of the victim has been updated.

At 430, the present embodiment downloads copies the victim's credit file from the credit bureau.

At 440, the present embodiment time stamps all incoming and outgoing data. In this way, a chronological history can be built up documenting the repair process. For example, all inquiries are time stamped. Also, all responses are time stamped.

At 450, the present embodiment, compares the response data and the new credit files of the victim to the most recent data that is stored in the victim's files to determine if the credit files have been updated. Specifically, the present embodiment is checking to see if the victim's credit file has been updated to reflect the fraudulent identity theft incident, as well as the presence of a fraud alert.

At 460, the present embodiment updates the chronological history with a time stamped entry documenting the comparison process and its results. This entry is placed into an evolving, historical, and accessible permanent record (e.g., a permanent resolution response record) that provides a victim with a documented history of the fraudulent identity theft incident and its repair.

For instance the permanent record is accessible to the victim via a web based service, in one embodiment. The record can be delivered to anyone who is attempting to collect on a fraudulent debt to prove that they indeed were victimized. This document can also be used to satisfy law enforcement inquiries about whether a victim is indeed a victim and has taken steps to resolve the problem. This record is permanent, continually updated, and accessible by the victim.

At 470, the present embodiment begins a second countdown (e.g., 5 days) before returning to the operation of 410 to perform the follow-up process. This iterative follow-up process is performed until all of the victim's records are updated properly.

Figure 5A:
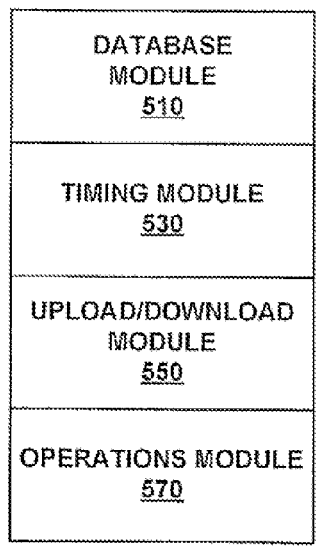
FIG. 5A is a block diagram illustrating a system that is capable of automatically repairing a fraudulent identity theft incident, in accordance with one embodiment of the present invention.

FIGS. 5A, 5B, 5C, 5D, and 5E provide a description of a system 500A for repairing identity theft. FIG. 5A provides the general illustration of the modules comprising the system 500A, and FIGS. 5B, 5C, 5D, and 5E provide a more detailed illustration of the functions of the modules of the system 500A.

FIG. 5A is an exemplary block diagram of an electronic system 500 for repairing identity theft, in accordance with one embodiment of the present invention. The system is located in a centralized location, and is accessible through an interface over a communication network. For instance the system 500 can be located on a web-enabled site to provide a web enabled repair service.

The system 500 comprises a database module 510 for storing the victim specific information, and generated documentation, such as populated notification forms, as previously described. The database module 510 contains the database used to store victim data and data received from credit bureaus, banks, creditors and other sources. Information that comes into the system 500 from sources (downloaded information) is catalogued and inserted into the database. The database module 510 is the archive location for the operation 570 and upload/download 550 modules.

The system 500 comprises a timing module 530 for time stamping actions taken by the system 500 to repair a fraudulent identity theft incident. The time module 530 controls the time-stamping and chronological history aspects of the system 500. The time module 530 time stamps all data that is received (downloaded) and sent (uploaded). By time-stamping the data sent to sources for resolution, follow up inquiries on data process is completely automated.

As a result, by time stamping all actions taken by system 500 and storing it in a permanent record, a chronological history of the repair of the fraudulent identity theft incident is provided. This permanent record creates a "living record" file that continuously evolves. The timing module 530 provides a level of document assurance and authenticity since time stamped files cannot be altered after they are stamped. The timing module 530 hands data off to the upload/download module 550 for sending (uploading). Conversely, the upload/download module 550 hands off data to the timing module 530 when data is received (downloaded).

The system 500 also comprises an upload/download module 550 for handling the receipt and transmission of victim specific information. The victim specific information is associated with the repair of the fraudulent identity theft incident committed on the victim. The upload/download module 550 handles the transmission (upload) and receipt (download) of data. The upload/download module 550 is composed of a credit bureau file retrieval application (e.g. MCE Metro Credit Engine), a customized METRO-2 compliant upload application and a secondary transmission application (STA). The STA can be used to send data to locations that may not have a METRO-2 victim application in an alternative format such as text facsimile. When upload/download module 550 receives data, it is sent through the timing module 530 and then to the database module 510.

Also the system 500 comprises an operations module 570 for automatically generating the populated notification forms. The notification forms are populated with the victim specific information. The operations module 570 also is responsible for transmitting the populated notification forms to affected creditors, credit bureaus, police departments, state agencies, federal agencies, and any other required entity in response to a notification of the fraudulent identity theft incident.

The operations module 570 is the central control of the system 500 where downloaded data is coordinated with victim data and assembled into the files to be sent to the various institutions. This module contains the master template of the IDTA, and the master template of the FAS form. Also, operations module 570 generates the permanent record with historical data pulled from the database module 510. The operations module 570 acquires data from both victim input (via the web or on the telephone) and the database module 510. When data is ready to send, the operations module 570 passes data through the timing module 530 and then the data is then queued in the upload/download module 550.

Figure 5B:
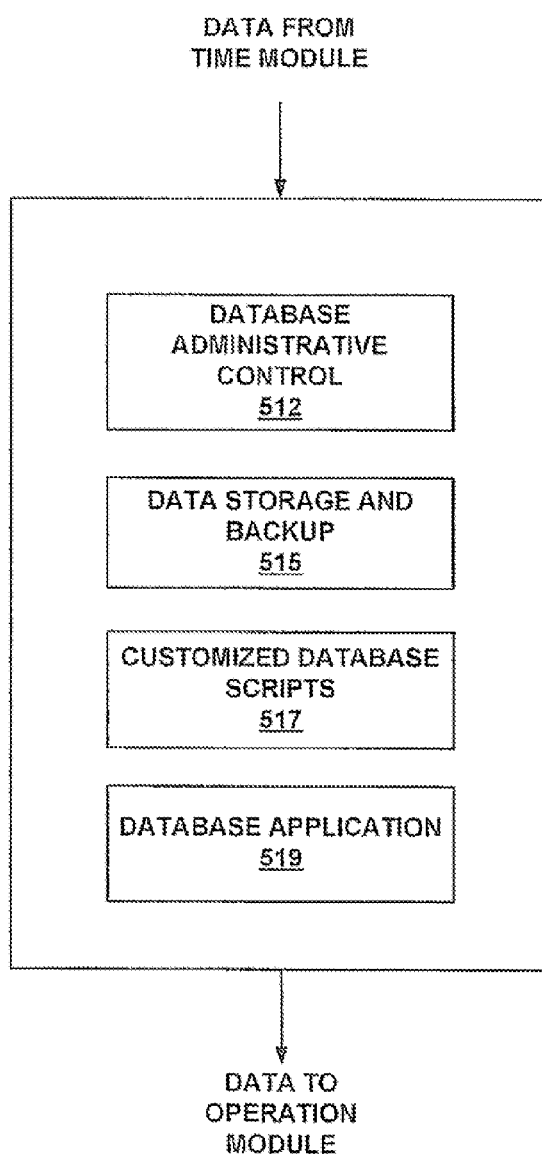
FIG. 5B is a block diagram illustrating a database module for storing information associated with repairing a fraudulent identity theft incident, in accordance with one embodiment of the present invention.

FIG. 5B is an exemplary block diagram of the database module 510 of FIG. 5A, in accordance with one embodiment of the present invention. FIG. 5B provides a more complete description of the database module 510. Data is supplied to the database module 510 from the timing module 530, and outputted to the operations module 570. The database module 510 comprises a database administrative control module 512, a data storage and backup module 515, customized data scripts 517, and a controlling database application 519.

The database application 519 provides a main database for the system 500 to store victim data, credit bureau data and supporting document data. The database application 519 feeds the data demands of the operations module 570 as well as warehouses the chronological data of the repair process.

In addition, this database application 519 utilizes the stamping action of the timing module 530 to build a historical database of the victim's resolution process. This historical database is used to feed the evolving historical and permanent record that proves both the legitimacy of the victim's case as well as a time-stamped and verifiable record of resolution.

The customized database scripts 517 provide the essential facets of the database module 510. These facets include query/search actions, web applications, formulas and computational algorithms that are vital to making the database function in a optimal, expeditious and stable manner. These scripts and mini-applications are used to evaluate and assess credit file contents stored in the database. The database script 517 is also used to generate tabular data sets for the permanent record and other output documents.

The data storage and backup module 515 provides the archival and storage component of the database module 510. This is a blend of hardware, software and removable media (backup), to store active data, backup active data and preserve archival data.

In addition, the database module 510 comprises a database administrative control module 512. The database administrative control module 512 is used by the database administrator to control the day-to-day function of the database, maintain policies and data integrity and provide maintenance and general upkeep of the database. These controls also include the authentication/authorization and user class schemes for database access.

In one embodiment, the database module 510 provides for flexible client data. That is, the present embodiment is able to store the data and information from the victim and the information received from the credit bureaus using numerous data formats communicated over various communication protocols. This facet of system 500 provides the ability to easily assemble data into a variety of formats and for multiple methods of transmission. For example, if a police department requests a copy of the victims case file or the permanent record, but may not have a METRO 2 client computer or access to one, the system 500 can easily parse the data into fax format and simply fax the information.

In addition, the retrieval (download) and sending (uploading) of information to and from the major credit bureaus is provided in various formats. Furthermore, information also needs to be sent to account issuers, banks, and debt collection agencies and potentially law enforcement agencies in various formats. This information needs to be readily accessible, securely received and transmitted and database compatible.

In one embodiment, a communication protocol substantially complying with the Credit Manager (METRO 2) application is used to send information to the credit bureaus. This METRO 2 application allows the present embodiment to retrieve credit reports, risk charts and other information (download). The merit credit engine communication application acts as an interface between them and the credit bureau systems. The METRO 2 communication protocol acts as an interface to the credit bureau systems. Known to credit report servers or engines, these METRO 2 protocol provides a software interface to communicate with credit agencies to retrieve report data, export it to a database, use it for web enabled applications, etc.

In another embodiment, the Merit Credit Engine (MCE) communication bundle of applications can be used to communicate with credit agencies.

In addition, these METRO 2 and MCE bundle of applications provide the system 500 with a mechanism to view victim credit bureau data as it stands during an incident of identity theft as well as to follow up on updating of the credit file of the victim with the correct information. In addition, this MCE bundle of applications enables system 500 victims to view their credit information over a web enabled site that provides the identity repair service should they choose to do so.

Figure 5C:
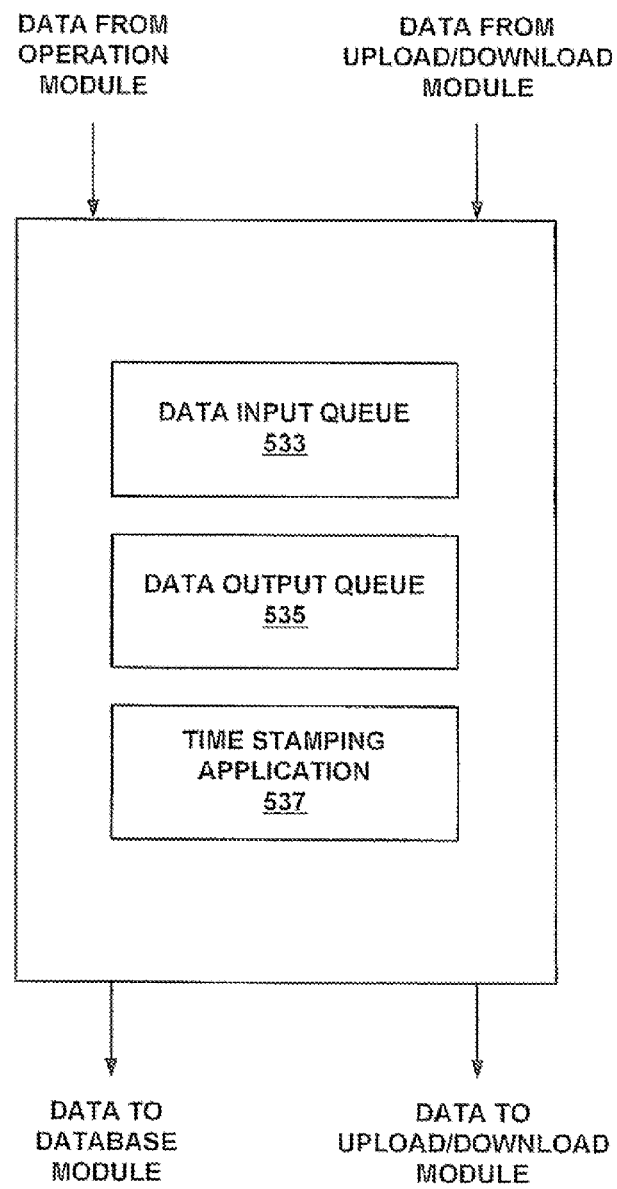
FIG. 5C is a block diagram illustrating a timing module for implementing a chronological history of the process of repairing a fraudulent identity theft incident, in accordance with one embodiment of the present invention.

FIG. 5C is an exemplary block diagram of the timing module 530 of FIG. 5A, in accordance with one embodiment of the present invention. FIG. 5C provides a more complete description of the timing module 530. Data is inputted into the timing module 530 from the operations module 570 as well as the upload/download module 550, and outputted to the operations module 570 and the upload/download module 550. The timing module 530 comprises a data input queue 533, data output queue 535, and a time stamping application 537.

The time stamping application 537 gives each file catalogued in the database module 510 or being transmitted through the upload/download module 550 a permanent and irreversible stamp bearing the time and date the file passed through the timing module 530.

In addition, in another embodiment, the timing module 530 also places a "lock" on the file, so that it cannot be further modified or changed at that time. The time stamp shows when the file was created and last changed. The time stamping action of the timing module 530 provides the chronological aspects of the historical, permanent record of the repair process, showing when progress has been made in the repair process as well as the proof (and time/date) of when the IDTA and FAS were submitted and to whom.

The data input queue 533 is the "holding pen" for data coming into the timing module 530. With both the upload/download module 550 and the operation module 570 sending data through the timing module 530 throughout the repair process, an effective input queue is vital to preventing an overload of the time stamping application 537.

The data output queue 535 provides the same function as the data input queue 533 except at the opposite end of the transaction. Since the data is being sent to two modules (database module 510 and the upload/download module 550)

almost simultaneously, a "buffer" of sorts is necessary to prevent an overload of the database or clogging the uploading of information provided by the time stamping application 537 past its capacity.

Figure 5D:
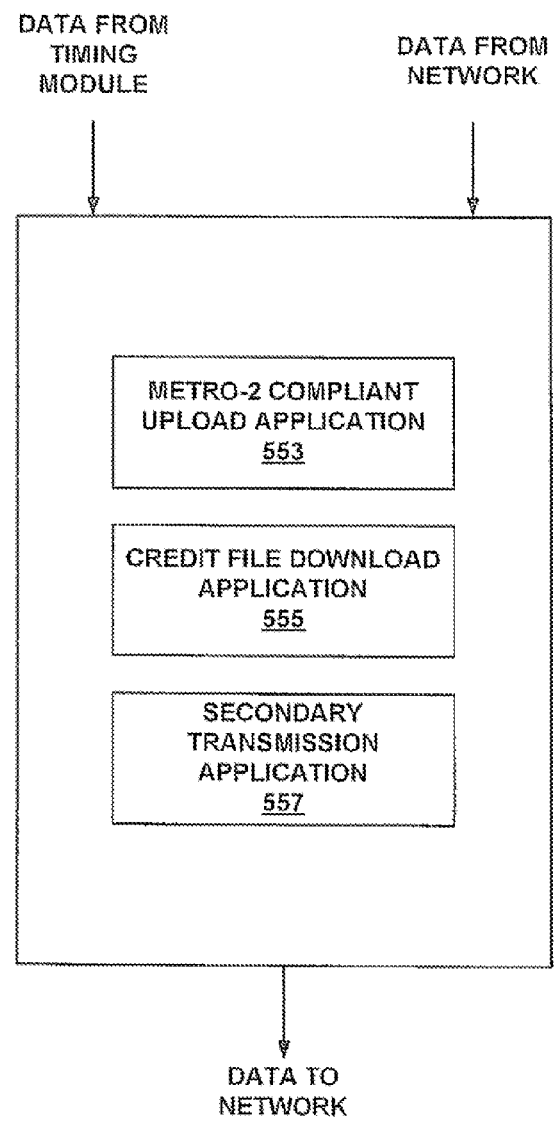
FIG. 5D is a block diagram illustrating an upload/download module for providing a communication interface to a network, in accordance with one embodiment of the present invention.

FIG. 5D is an exemplary block diagram of the upload/download module 550 of FIG. 5A, in accordance with one embodiment of the present invention. FIG. 5D provides a more complete description of the upload/download module 550. Data is inputted into the upload/download module 550 from the timing module 530 and from a communications network, and outputted to the network. The database module 510 comprises a METRO-2 compliant upload application 553, a credit file download application 555, and a secondary transmission application 557.

The METRO-2 compliant upload application 553 transmits data to the credit bureaus (e.g., Equifax, Experian, TransUnion, etc). This METRO-2 compliant upload application 553 sends IDTA, FAS, and other data to the credit bureaus. This METRO-2 compliant upload application 553 can also send information to creditors, municipal, state or federal government agencies or anyone with a METRO-2 compatible application.

The credit file download application 555 provides on-demand access to a victim's credit bureau files from the credit bureaus. When credit files are downloaded they pass through the timing module 530 (for time-stamping) and are stored in the database module 510.

In addition, the system 500 also provides for multiple methods of sending data to recipients. A secondary transmission application 557 provides this functionality. This is important, since some recipients (e.g. law enforcement) may not have access to a METRO-2 compliant reporting application. Using the secondary transmission application 557, the data can be transmitted as fax documents, portable documents (PDF), text formatted documents and others. This secondary transmission application 557 has the flexibility to transmit documents in virtually any format demanded by an institution.

Figure 5E:
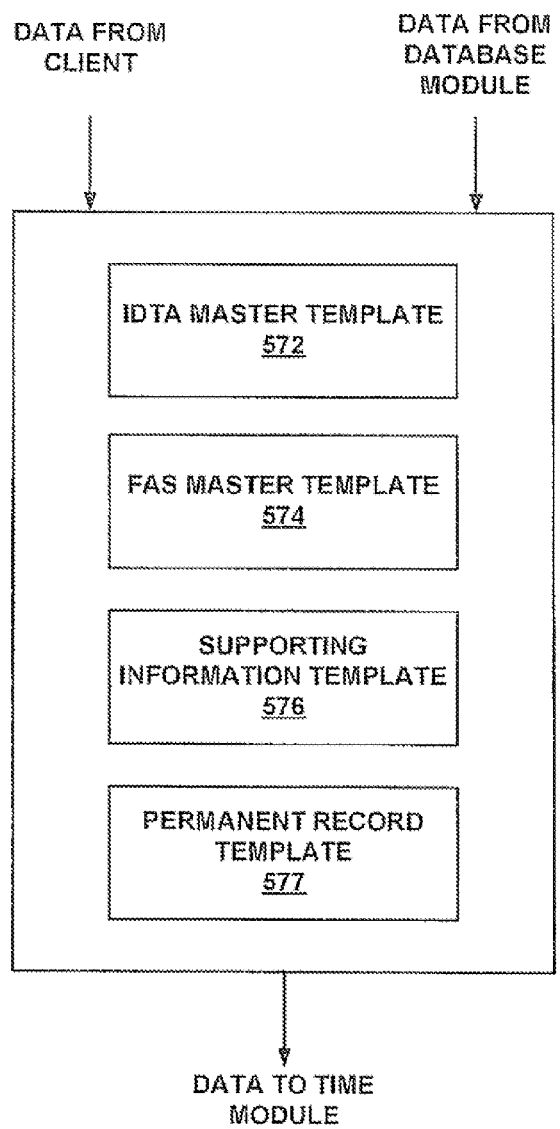
FIG. 5E is a block diagram illustrating an operations module for performing automatic repair of a fraudulent identity theft incident, in accordance with one embodiment of the present invention.

FIG. 5E is an exemplary block diagram of the operations module 570 of FIG. 5A, in accordance with one embodiment of the present invention. FIG. 5E provides a more complete description of the operations module 570. Data is inputted into the operations module 570 victim and from the database module 510, and outputted to the timing module 530. The operations module 570 comprises an IDTA master template 572, at least one FAS master template, supporting information template 576, and a permanent record template 577.

The IDTA & FAS Master Templates, 572 and 574, respectively, are template files that are organized and compiled to contain the required information on the FTC approved IDTA and FAS forms. These templates are filled with data supplied by the victim as previously described.

The supporting information template 576 provides a uniform method of providing supporting documentation (e.g. utility bill, proof of residence, identifying documentation such as a passport) that is required to repair an identity theft incident. This supporting information template 576 allows the data to be sent in multiple formats and then placed onto the template. The template contains referencing information linking it to the appropriate victim case, account and creditor. The supporting information documents are sent at the same time as their corresponding IDTA and FAS documents.

The permanent record template 577 is the template file for the historical, permanent record that shows the victim has been harmed, and provides a historical and evolving record of the repair process. This permanent record is created as soon as the victim initiates the repair process. The timing module 530 provides the chronological aspects of the permanent record and the database module 510 provides the historical information for the permanent record.

Figure 6:
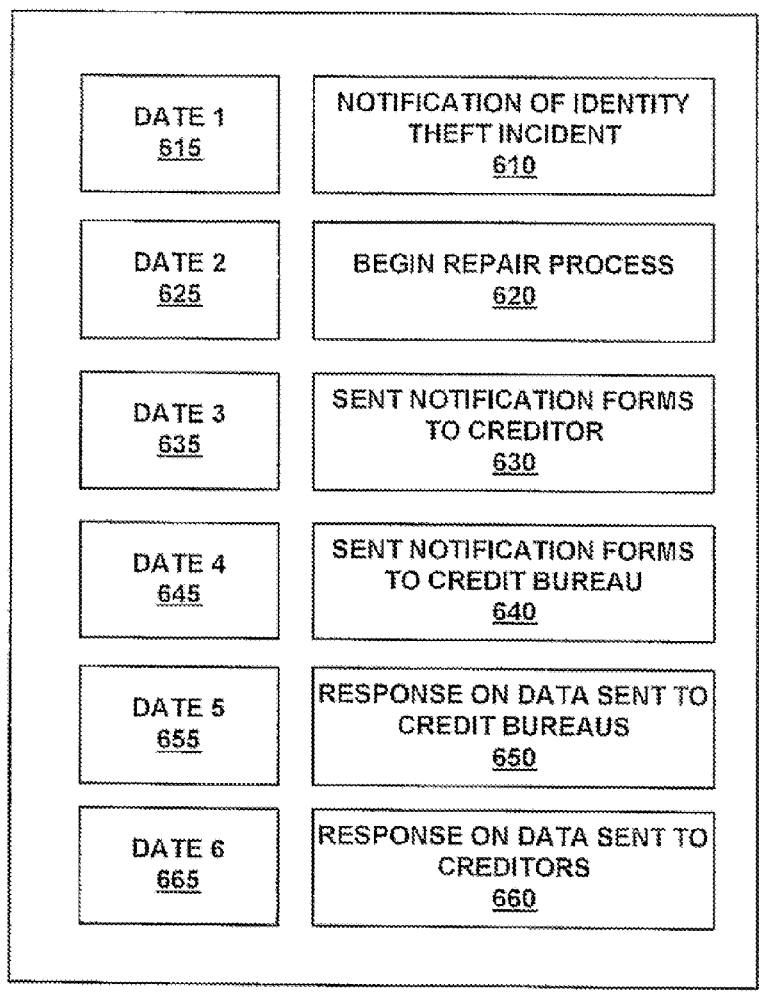
FIG. 6 is an illustration of a permanent resolution response record providing a chronological history of the process of repairing a fraudulent identity theft incident, in accordance with one embodiment of the present invention.

FIG. 6 is an exemplary illustration of a permanent chronological record 600 that is generated. The permanent record 600 provides a chronological history of actions taken to repair a fraudulent identity theft incident. The record is automatically and continuously generated as the actions are completed. In addition, the permanent record 600 is accessible to a victim of the fraudulent identity theft incident, associated creditors, and a plurality of credit bureaus.

The permanent record 600 comprises a plurality of entries that chronicles the actions taken to repair an identity theft incident. The entries are time stamped to provide the chronology. In addition, the entries can be locked and tamper proof.

For example, the permanent record 600 may contain an entry 610 that illustrates the reporting of the fraudulent identity theft incident. A time stamp 615 is provided to give the date and time the entry 610 was performed and/or entered into the permanent record 600.

The permanent record may also contain an entry 620 that illustrates when the process of repair began. A time stamp 625 is provided to give the date and time the entry 620 was performed and/or entered into the permanent record 600.

The permanent record may also contain an entry 630 that illustrates how and when a creditor of the victim of identity theft was notified. A time stamp 635 is provided to give the date and time the entry 630 was performed and/or entered into the permanent record 600.

The permanent record may also contain an entry 640 that illustrates how and when a credit bureau was notified of the fraudulent identity theft incident. A time stamp 645 is provided to give the date and time the entry 640 was performed and/or entered into the permanent record 600.

The permanent record may also contain an entry 650 that illustrates a received response from credit bureaus in association with repairing the fraudulent identity theft incident. A time stamp 655 is provided to give the date and time the entry 650 was performed and/or entered into the permanent record 600.

The permanent record may also contain an entry 660 that illustrates a received response from creditors in association with repairing the fraudulent identity theft incident. A time stamp 665 is provided to give the date and time the entry 660 was performed and/or entered into the permanent record 600.

The permanent record 600 is generated in conjunction with the system 500 of FIG. 5A, in accordance with one embodiment of the present invention. as such, the timing module 530, through the time stamping application, generates a chronology of the repair process. This chronology is established by time stamping everything that goes out of the system 500 and everything that is inputted. This feature contributes to the permanent record 600 in that each action outlined on the permanent record 600 has a time-stamp that shows when that action or response occurred.

In addition, the database module 510 provides the historical data accumulated through the repair process. This data can be extracted from the database module 510 using one of the database scripts 517 of FIG. 5B and the data is then sent to the operations module 570.

Also, the operations module 570 combines the data received from the database module 510 and the timing module 530 and put them into the template of the permanent record 600. The template shows the data in an organized, easy-to-understand format. The resulting permanent record 600 can be accessed from the web or by a customer representative by the victim or by associated creditors and credit bureaus.

Figure 7:
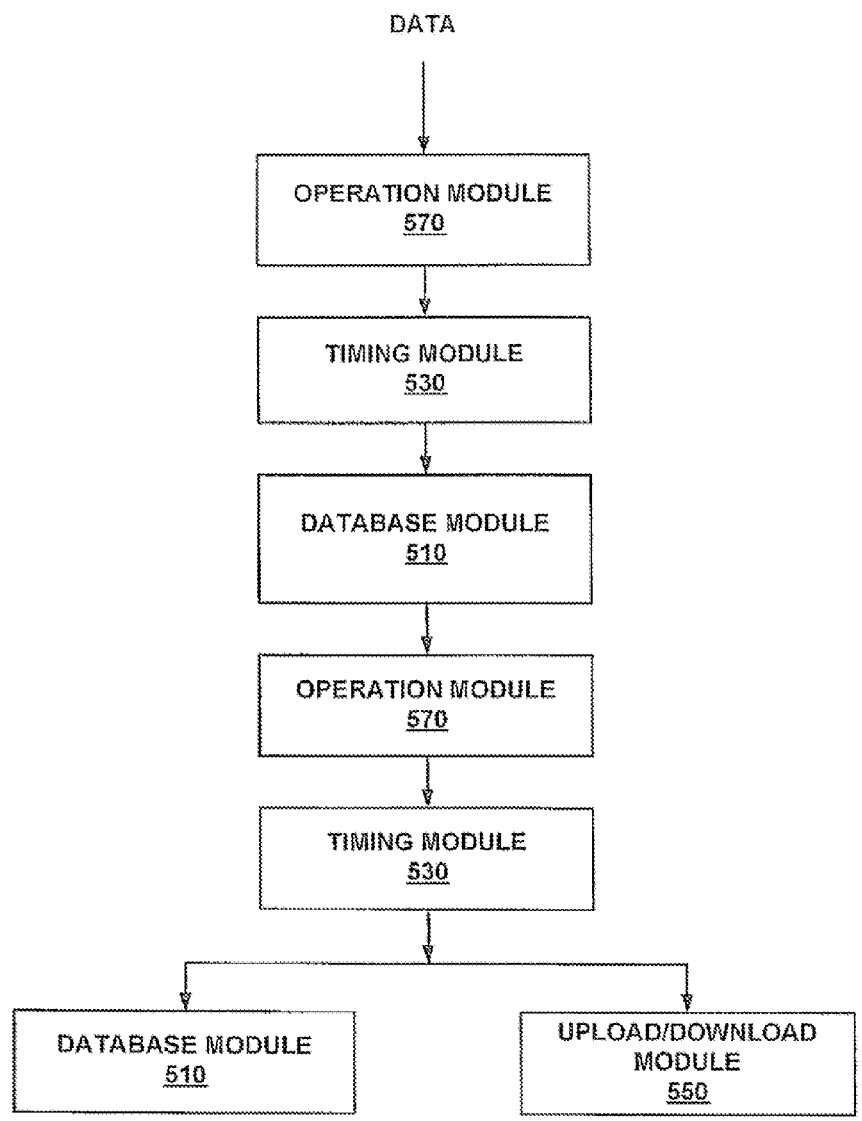
FIG. 7 is a data flow diagram illustrating the flow of data that is transmitted from a system capable of automatically repairing a fraudulent identity theft incident, in accordance with one embodiment of the present invention.

FIG. 7 is a data flow diagram 700 illustrating the inflow of information through a identity theft repair system 500 of FIG. 5A, in accordance with one embodiment of the present invention. When data first flows through the system 500 to be outputted, the data starts at the operations module 570. There can be two or more channels of input for the data (e.g., via the web form, or over the phone with a customer representative). Data enters the operations module 570 to be formatted and spread onto files via the template applications, as previously described.

The newly formatted data files are then sent to the timing module 530 for their first timestamp. This operation chronicles the repair process in the permanent record (e.g., record 600).

The time-stamped files are then sent to the database module 510 and catalogued into the victim's unique data record within the database application. The data sent in can also be compared with data on file (victim info, credit files downloaded when victim joined program, etc.).

The data is then sent back to operations module 570 for "final casting" into the templates. Since the data received has been compared and analyzed by the database application, it is clear which accounts are fraudulent and how many IDTAs and FASs are needed. The data is then spread over the correct number of files, along with the supporting documentation. These files are then in their final stage for transmission.

In the final stage, the data files enter the timing module 530 and are given their second time-stamp. This shows when the files passed through the timing module 530 as well as the upload time (determined by the output queue). The time-stamp also contains instructions on how the document and time-stamp can be verified by the recipient.

The time-stamped files are sent to the upload/download module 550 that transmits them (in METRO-2 format to the credit bureaus and financial institutions, and secondary formats to others). The files have now been sent to the appropriate entities and the repair process is proceeding. The countdown to a follow-up inquiry, as previously described, has also been started.

The time stamped files are also sent simultaneously to the database module 510. The time stamped files are stored in the victim's data record in an accessible format. When the victim wants a permanent record that provides a chronological history of the repair process, the data contained in the time stamped files are pulled to complete the record, which is continually updated.

Figure 8:
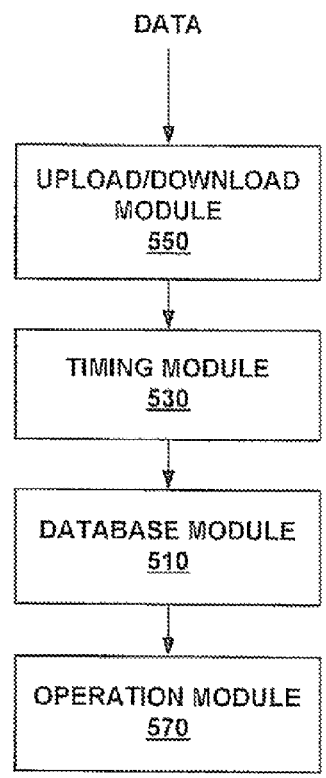
FIG. 8 is a data flow diagram illustrating the flow of data that is stored in a system capable of automatically repairing a fraudulent identity theft incident, in accordance with one embodiment of the present invention.

FIG. 8 is a data flow diagram 800 illustrating the outflow of information through a identity theft repair system 500 of FIG. 5A, in accordance with one embodiment of the present invention. Data first enters the system 500 through the upload/download module 510. This would be response data from the credit bureaus, institutions or other entities that data has been sent to. The data is downloaded using a credit file retrieval application for credit file data, and other methods (e.g. fax, portable document files, electronic mail, etc.). The system 500 is available to receive data from creditors, law enforcement or other agencies as needed.

The data is passed from the upload/download module 510 to the timing module 530. The timing module 530 stamps the incoming data, adding to the evolving chronology of the resolution process. The time-stamp on the incoming data also expedites database comparisons of data transmitted (upload) and data received (download). This vividly illustrates the resolution process and where the repair process is pending.

After the incoming data has been time-stamped, it is sent to the database module 510. Once there, it is added to the victim's data record and then compared against the data sent. The database scripts perform this comparison to show which data has been acted on and which remains the same. This information is also used to update the permanent chronological record via the operations module 570.

Once the incoming data has been recorded and stored in the database of the database module 510, an extract of the data is sent to the operation module 570. This extract contains responses and/or actions from institutions (banks, creditors, credit bureaus) that have received IDTA or FAS transmissions. This provides the data that is entered as an entry in the permanent chronological record, which can be accessed via the website.

While the methods of embodiments illustrated in flow charts 200, 300 and 400 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system automatically repairing a fraudulent identity theft incident is thus described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

What is claimed:

1. A non-transitory computer-readable media containing one or more computer-executable instructions which when executed by a computing device perform method of repairing identity theft comprising:
   a) accessing notification of a fraudulent identity theft incident committed on a victim;
   b) collecting victim specific information associated with said fraudulent identity theft incident and said victim;
   c) automatically populating notification forms with said victim specific information detailing said fraudulent identity theft incident for affected creditors and credit bureaus;
   d) automatically transmitting said populated notification forms to said affected creditors and said credit bureaus;
   e) receiving responses to said transmitted populated notification forms from said affected creditors and said credit bureaus;
   f) stamping a record of each of a plurality of actions that have occurred in furtherance of repairing said fraudulent identity theft incident with a tamper resistant stamp bearing a time and a date that said action occurred, wherein said actions include said notification, said transmitted populated notification forms and said received responses from said affected creditors and said credit bureaus; and g) storing each of said time stamped record of actions as a locked file in a computer readable data structure chronicling said actions that have occurred in furtherance of repairing said fraudulent identity theft incident.

2. The method of claim 1, wherein said notification forms comprise a substantially compliant Federal Trade Commission Identity Theft Affidavit (IDTA) form and a substantially compliant FTC Fraudulent Account Statement (FAS) form.

3. The method of claim 1, wherein said victim specific information comprises documentation supporting fraudulent identity theft incident.

4. The method of claim 1, further comprising:
verifying said fraudulent identity theft incident before performing said transmitting said notification form in d).

5. The method of claim 1, further comprising:
automatically notifying appropriate law enforcement agencies of said fraudulent identity theft incident; and
wherein said actions further include said notification to said appropriate law enforcement agencies.

6. The method of claim 1, wherein said a)-g) are performed by a web based computer system.

7. The method of claim 1, further comprising:
h) in response to a predetermined period of time, automatically determining if said creditors and said bureaus have taken appropriate action in response to said transmitted populated notification forms to remedy said fraudulent identity theft incident.

8. The method of claim 7, further comprising:
i) automatically transmitting reminders regarding said transmitted populated notification forms to appropriate creditors and credit bureaus that are not taking appropriate action of said fraudulent identity theft incident; and
wherein said actions further include said transmitted reminders.

9. The method of claim 7, wherein said predetermined period is measured from a given time stamped action.

10. A computer implemented system for repairing identity theft comprising:
an upload/download module for handling the receipt of victim specific information associated with the repair of a fraudulent identity theft incident committed on a victim, the transmission of notification forms populated with said victim specific information to affected creditors and credit bureaus, and the receipt of responses to said transmitted notification forms;
a timing module for time stamping each record of actions associated with the repair of said fraudulent identity theft incident, wherein said actions include said notification, said transmitted populated notification forms and said received responses to said transmitted notification forms from said affected creditors and said credit bureaus;
an operations module for automatically generating said notification forms and controlling receipt of said victim specific information, transmission of said notification forms and receipt of said responses; and
a database module for storing said time stamped record of each action that include said received victim specific information, said transmitted notification forms and said received responses.

11. The method of claim 7, wherein said automatically determining if said creditors and said bureaus have taken appropriate action comprises:
downloading a current credit file of said victim's from at least one credit bureau;
comparing said current credit file to one or more of said locked files in said computer readable data structure to determine if said fraudulent identity theft incident has been updated on said victim's credit file; and
wherein said actions further include said comparison of said current credit file and said one or more locked filed in said computer readable data structure.

12. The method of claim 8, wherein said h)-i) are iteratively performed until resolution and repair of said fraudulent identity theft incident is verified with each of said affected creditors and credit bureaus.

13. The method of claim 8, further comprising automatically notifying said victim of each actions that has occurred in furtherance of repairing said fraudulent identity theft incident.

14. The method of claim 8, wherein said files in said computer readable data structure are accessible by said victim and at least one of said affected creditors and credit bureaus based on an authorization scheme for access to said computer readable data structure.

15. The system of claim 10, further comprising:
a chronological record that is generated by said operations module and stored in said database module, wherein said chronological history comprises said time stamped actions taken to remedy said fraudulent identity theft incident.

16. The system of claim 10, wherein each state of said populated notification forms are locked in said database module.

17. The system of claim 10, wherein said operations module automatically collects said victim specific information.

18. The system of claim 10, wherein communication with said system is over a secure socket layer.

19. The system of claim 10, wherein communication with said system is through the internet.

20. The system of claim 10, wherein communication through said upload/download module substantially complies with a METRO-2 communication protocol.

21. The method of claim 10, wherein said credit bureaus are taken from a group consisting essentially of:
Equifax;
TransUnion; and
Experian.

22. The system of claim 10, wherein said operations module notifies appropriate police agencies and the Federal Trade Commission (FTC) of said fraudulent identity theft incident.

23. The system of claim 15, wherein entries in said chronological record are locked upon recordation.

24. A computer system comprising a processor and a computer readable memory coupled to said processor and comprising program instructions that, when executed, implement a method of automatically repairing identity theft comprising:
a) accessing notification of a fraudulent identity theft incident committed on a victim;
b) collecting victim specific information associated with said fraudulent identity theft incident and said victim;
c) automatically populating notification forms regarding said fraudulent identity theft incident with said victim specific information detailing said fraudulent identity theft incident for affected creditors and credit bureaus;
d) automatically transmitting said populated notification forms to said affected creditors and said credit bureaus;
e) receiving responses to said transmitted notification forms; and
f) chronicling by time in a locked file a record of each of a plurality of actions that have occurred in furtherance of repairing said fraudulent identity theft incident, wherein said actions include said transmitted populated notification forms and said received responses to said transmitted notification forms.

25. The computer system of claim 24, wherein c) in said method further comprises:
   time stamping each of said notification forms; and
   storing said time stamped notification forms as a file in said record.

26. The computer system of claim 24, wherein said notification forms comprises substantially compliant Federal Trade Commission Identity Theft Affidavit (IDTA) form and a substantially compliant FTC Fraudulent Account Statement (FAS) form.

27. The computer system of claim 24, wherein said victim specific information comprises documentation supporting fraudulent identity theft incident.

28. The computer system of claim 24, wherein said method further comprises:
   verifying said fraudulent identity theft incident before performing said transmitting said notification forms in d).

29. The computer system of claim 24, wherein said method further comprises:
   automatically notifying appropriate law enforcement agencies of said fraudulent identity theft incident.

30. The computer system of claim 24, wherein said a)-f) in said method are performed by a web based computer system.

31. The computer system of claim 24, wherein said method further comprises:
   in response to a predetermined period of time after transmitting said populated notification forms, automatically verifying that said creditors and said credit bureaus have taken appropriate action to remedy said fraudulent identity theft incident.

32. The computer system of claim 31, wherein said method further comprises:
   automatically transmitting reminders regarding said fraudulent identity theft incident to appropriate creditors and credit bureaus that said verifying determines are not taking appropriate action to remedy said fraudulent identity theft incident; and
   wherein said actions further include said transmitted reminders.

* * * * *